United States Patent
Guo et al.

(10) Patent No.: US 9,838,405 B1
(45) Date of Patent: Dec. 5, 2017

(54) SYSTEMS AND METHODS FOR DETERMINING TYPES OF MALWARE INFECTIONS ON COMPUTING DEVICES

(71) Applicant: Symantec Corporation, Mountain Views, CA (US)

(72) Inventors: Fanglu Guo, Rancho Palos Verdes, CA (US); Kevin Roundy, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 75 days.

(21) Appl. No.: 14/947,878

(22) Filed: Nov. 20, 2015

(51) Int. Cl.
*G06F 11/00* (2006.01)
*H04L 29/06* (2006.01)

(52) U.S. Cl.
CPC ........ *H04L 63/1416* (2013.01); *H04L 63/145* (2013.01); *H04L 63/1433* (2013.01)

(58) Field of Classification Search
CPC H04L 63/1416; H04L 63/1433; H04L 63/145
See application file for complete search history.

(56) References Cited

U.S. PATENT DOCUMENTS

| | | |
|---|---|---|
| 7,352,280 B1 | 4/2008 | Rockwood |
| 8,214,905 B1 | 7/2012 | Doukhvalov et al. |
| 9,098,706 B1 | 8/2015 | Kennedy |
| 9,270,467 B1 | 2/2016 | Chen et al. |
| 9,413,780 B1 | 8/2016 | Kaplan et al. |
| 9,485,272 B1 | 11/2016 | Roundy |
| 2002/0083070 A1 | 6/2002 | Shuster |
| 2005/0283837 A1 | 12/2005 | Olivier et al. |
| 2006/0230451 A1 | 10/2006 | Kramer et al. |
| 2006/0242712 A1 | 10/2006 | Linn et al. |
| 2006/0253548 A1 | 11/2006 | Vitanov et al. |
| 2006/0259967 A1* | 11/2006 | Thomas ............... H04L 63/145 726/22 |

(Continued)

OTHER PUBLICATIONS

Suleiman Y. Yerima et al. "A New Android Malware Detection Approach Using Bayesian Classification," 2013 IEEE Computer Society, pp. 121-128.*

(Continued)

*Primary Examiner* — Luu Pham
*Assistant Examiner* — Canh Le
(74) *Attorney, Agent, or Firm* — FisherBroyles, LLP (57) ABSTRACT

The disclosed computer-implemented method for determining types of malware infections on computing devices may include (1) identifying multiple types of security events generated by a group of endpoint devices that describe suspicious activities on the endpoint devices, each of the endpoint devices having one or more types of malware infections, (2) determining correlations between each type of security event generated by the group of endpoint devices and each type of malware infection within the group of endpoint devices, (3) identifying a set of security events generated on a target endpoint device that potentially has a malware infection, and (4) detecting, based on both the set of security events generated on the target endpoint device and the correlations between the types of malware infections and the types of security events, at least one type of malware infection likely present on the target endpoint device.

18 Claims, 6 Drawing Sheets

(56) References Cited

U.S. PATENT DOCUMENTS

| | | | |
|---|---|---|---|
| 2007/0240217 A1* | 10/2007 | Tuvell | G06F 21/56 726/24 |
| 2008/0086772 A1 | 4/2008 | Chesla | |
| 2009/0089290 A1 | 4/2009 | Nachenberg et al. | |
| 2009/0217370 A1 | 8/2009 | Hulten et al. | |
| 2010/0083376 A1 | 4/2010 | Pereira et al. | |
| 2010/0228852 A1* | 9/2010 | Gemelos | G06Q 30/02 709/224 |
| 2012/0144492 A1* | 6/2012 | Griffin | G06F 21/56 726/25 |
| 2012/0233698 A1 | 9/2012 | Watters et al. | |
| 2013/0074143 A1 | 3/2013 | Bu et al. | |
| 2013/0247187 A1* | 9/2013 | Hsiao | G06F 21/552 726/22 |
| 2014/0096246 A1* | 4/2014 | Morrissey | G06F 21/51 726/23 |
| 2014/0283066 A1 | 9/2014 | Teddy et al. | |
| 2015/0074806 A1 | 3/2015 | Roundy et al. | |
| 2015/0128263 A1* | 5/2015 | Raugas | H04L 63/1408 726/23 |
| 2015/0207813 A1 | 7/2015 | Reybok et al. | |
| 2015/0372976 A1 | 12/2015 | Lonas et al. | |
| 2016/0029221 A1* | 1/2016 | Suarez Garcia | G06F 21/561 455/410 |
| 2016/0072836 A1 | 3/2016 | Hadden et al. | |
| 2016/0080400 A1 | 3/2016 | Sim et al. | |
| 2016/0156646 A1* | 6/2016 | Hsueh | G06F 21/563 726/1 |
| 2016/0292419 A1* | 10/2016 | Langton | G06F 21/567 |

OTHER PUBLICATIONS

Mohamad Zolkipli et al., "A Frame for Malware Detection Using Combination Technique and Signature Generation," IEEE Computer Society, 2010, pp. 196-199.*

Mohd Razak et al., "THe Rise of Malware: Bibliometric analysis of malware study," Journal of Network and Computer Applications 75, 2016, pp. 58-76.*

Kevin Alejandro Roundy; Systems and Methods for Estimating Confidence Scores of Unverified Signatures; U.S. Appl. No. 14/307,477, filed Jun. 18, 2014.

Kuang, Liwei (Vivian), "DNIDS: A Dependable Network Intrusion Detection System Using the CSI-KNN Algorithm", https://qspace.library.queensu.ca/bitstream/1974/671/2/Kuang_Liwei_200709_MSc.pdf, as accessed Apr. 25, 2014, A thesis submitted to the School of Computing in conformity with the requirements for the degree of Master of Science, Queen's University, Kingston, Ontario, Canada, (Sep. 2007).

Yu, Dong et al., "Alert Confidence Fusion in Intrusion Detection Systems with Extended Dempster-Shafer Theory", http://citeseerx.ist.psu.edu/viewdoc/download;jsessionid=FF6509FDC7A1D361CA4AFC293FA41159?doi=10.1.1.188.1103&rep=rep1&type=pdf, as accessed Apr. 25, 2014, 43rd ACM Southeast Conference, Kennesaw, GA, USA, (Mar. 18-20, 2005).

"ArcSight", http://www8.hp.com/us/en/software-solutions/arcsight-express-siem-appliance/tech-specs.html?jumpid=reg_r1002_usen_c-001_title_r0002, as accessed Apr. 25, 2014, Hewlett-Packard Development Company, L.P., (2014).

Kevin Roundy, et al.; Systems and Methods for Identifying Non-Malicious Files on Computing Devices Within Organizations; U.S. Appl. No. 14/750,342, filed Jun. 25, 2015.

Kevin Roundy, et al.; Systems and Methods for Determining the Trustworthiness of Files Within Organizations; U.S. Appl. No. 14/753,051, filed Jun. 29, 2015.

"Stack Overflow", http://stackoverflow.com/, as accessed May 13, 2015, Stack Exchange Inc, (Mar. 1, 2000).

"Yelp", http://www.yelp.com/, as accessed May 13, 2015, (Nov. 28, 1996).

"Managed Security Services", http://www.symantec.com/managed-security-services/, as accessed Sep. 21, 2015, Symantec Corporation, (On or before Sep. 21, 2015).

"Naive Bayes classifier", https://en.wikipedia.org/wiki/Naive_Bayes_classifier, as accessed Sep. 21, 2015, Wikipedia, (Jan. 31, 2005).

"Probabilistic classification", https://en.wikipedia.org/wiki/Probabilistic_classification, as accessed Sep. 21, 2015, Wikipedia, (Aug. 7, 2014).

Lord, Nate, "Common Malware Types: Cybersecurity 101", https://www.veracode.com/blog/2012/10/common-malware-types-cybersecurity-101, as accessed Sep. 21, 2015, Veracode, (Oct. 12, 2012).

Kevin Alejandro Roundy, et al.; Systems and Methods for Detecting Security Threats; U.S. Appl. No. 15/084,522, filed Mar. 30, 2016.

"Association rule learning", https://en.wikipedia.org/wiki/Association_rule_learning, as accessed Mar. 2, 2016, Wikipedia, (Apr. 15, 2005).

Chris Gates, et al; System and Methods for Detecting Security Blind Spots; U.S. Appl. No. 15/266,320, filed Sep. 15, 2016.

Chris Gatres et al., Systems and Methods for Personalizing Security Incident Reports; U.S. Appl. No. 15/292,874, filed Oct. 13, 2016.

Kevin Alejandro Roundy, et al; Systems and Methods for Detecting Security Threats; U.S. Appl. No. 15/084,522, filed Mar. 30, 2016.

* cited by examiner

| Correlations 400 | Malware Infection 1 | Malware Infection 2 | Malware Infection 3 |
|---|---|---|---|
| Security Event 1 | 90% | 10% | 10% |
| Security Event 2 | 85% | 80% | 20% |
| Security Event 3 | 20% | 90% | 30% |
| Security Event 4 | 5% | 80% | 10% |
| Security Event 5 | 70% | 65% | 67% |

SYSTEMS AND METHODS FOR DETERMINING TYPES OF MALWARE INFECTIONS ON COMPUTING DEVICES

BACKGROUND

Some anti-malware systems may generate notifications (e.g., security events) in response to detecting certain types of suspicious activities on computing devices. Such notifications may be useful in warning users or administrators that a file on a computing device is malicious and/or that an attacker has accessed sensitive information on the computing device. For example, a notification that a program is hiding its system files may indicate a rootkit infection.

However, many of these notifications may simply describe normal computing behaviors of legitimate programs. As such, the majority of notifications may provide little or no value in detecting malware infections. For example, because hiding system files may be a behavior exhibited by many non-malicious programs, a traditional anti-malware system may ignore a notification that a program is hiding its system files in order to avoid a false alarm. In general, notifications associated with benign activities may create "noise" that overwhelms or obscures notifications describing malicious activities. As a result, conventional anti-malware systems that rely on analyzing notifications of suspicious behaviors may incorrectly classify benign activities as malicious and/or fail to accurately identify actual threats. The current disclosure, therefore, identifies and addresses a need for improved systems and methods for detecting malware infections on computing devices.

SUMMARY

As will be described in greater detail below, the instant disclosure describes various systems and methods for determining types of malware infections on computing devices by determining correlations between security events generated on a group of endpoint devices and types of malware infections present on the endpoint devices. The disclosed systems and methods may then use the determined correlations to detect a malware infection on an additional endpoint device based on the types of security events generated on the additional endpoint device.

In one example, a computer-implemented method for determining types of malware infections on computing devices may include (1) identifying multiple types of security events generated by a group of endpoint devices that describe suspicious activities on the endpoint devices, with each of the endpoint devices having one or more types of malware infections, (2) determining correlations between each type of security event generated by the group of endpoint devices and each type of malware infection within the group of endpoint devices, where each correlation indicates a probability that an endpoint device with a certain type of malware infection will generate a certain type of security event, (3) identifying a set of security events generated on a target endpoint device that potentially has a malware infection, and (4) detecting, based on both the set of security events generated on the target endpoint device and the correlations between the types of malware infections and the types of security events, at least one type of malware infection likely present on the target endpoint device.

In some examples, determining the correlation between the certain type of security event and the certain type of malware infection may include determining a percentage of endpoint devices with the certain type of malware infection that have generated the certain type of security event. In addition, in some embodiments, detecting the type of malware infection likely present on the target endpoint device may include (1) for each type of malware infection, determining a probability that the target endpoint device has the type of malware infection and (2) identifying the type of malware infection most likely to be present on the target endpoint device based on the determined probabilities. Additionally or alternatively, detecting the type of malware infection likely present on the target endpoint device may include performing a naïve Bayes classification.

In some embodiments, the method may further include identifying, for at least one type of malware infection, (1) pre-infection security events that are likely to be generated by an endpoint device before the endpoint device is infected with the type of malware infection and (2) post-infection security events that are likely to be generated by the endpoint device after the endpoint device is infected with the type of malware infection. In some examples, detecting the type of malware infection likely present on the target endpoint device may include determining, based on the pre-infection security events, that the target endpoint device is at an elevated risk of being infected with the type of malware infection but is not yet infected. In these examples, the method may include increasing security measures on the target endpoint device to reduce the risk of the target endpoint device being infected with the type of malware infection.

In other examples, detecting the type of malware infection likely present on the target endpoint device may include determining, based on the post-infection security events, that the target endpoint device has likely already been infected with the type of malware infection. In these examples, the method may include running a malware scan on the target endpoint device to confirm the presence of the malware infection and/or attempting to remove the malware infection from the target endpoint device.

In some embodiments, the method may further include identifying at least one type of security event generated by an endpoint device that does not have any malware infections. The method may then include determining, based on the security event generated by the endpoint device that does not have any malware infections and a set of security events generated by an additional target endpoint device, that the additional target endpoint device is likely to not have any malware infections.

In one embodiment, a system for implementing the above-described method may include (1) an identification module that (A) identifies multiple types of security events generated by a group of endpoint devices that describe suspicious activities on the endpoint devices, with each of the endpoint devices having one or more types of malware infections and (B) identifies a set of security events generated on a target endpoint device that potentially has a malware infection, (2) a determination module that determines correlations between each type of security event generated by the group of endpoint devices and each type of malware infection within the group of endpoint devices, where each correlation indicates a probability that an endpoint device with a certain type of malware infection will generate a certain type of security event, and (3) a detection module that detects, based on both the set of security events generated on the target endpoint device and the correlations between the types of malware infections and the types of security events, at least one type of malware infection likely present on the target endpoint device. In addition, the system may include at least one hardware processor configured to execute the identification module, the determination module, and the detection module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify multiple types of security events generated by a group of endpoint devices that describe suspicious activities on the endpoint devices, with each of the endpoint devices having one or more types of malware infections, (2) determine correlations between each type of security event generated by the group of endpoint devices and each type of malware infection within the group of endpoint devices, where each correlation indicates a probability that an endpoint device with a certain type of malware infection will generate a certain type of security event, (3) identify a set of security events generated on a target endpoint device that potentially has a malware infection, and (4) detect, based on both the set of security events generated on the target endpoint device and the correlations between the types of malware infections and the types of security events, at least one type of malware infection likely present on the target endpoint device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for determining types of malware infections on computing devices. As will be explained in greater detail below, the systems and methods described herein may perform a robust, comprehensive classification of the security events generated on an endpoint device to accurately predict which types of malware infections are most likely present on the endpoint device. For example, by analyzing security events generated by endpoint devices that are known to be infected with various types of malware, the disclosed systems and methods may determine correlations between types of security events and types of malware infections. Based on these correlations, the systems and methods described herein may determine that the security events generated by an additional endpoint device indicate that the endpoint device likely has a certain type of malware infection and/or is likely to obtain a certain type of malware infection.

Figure 1:
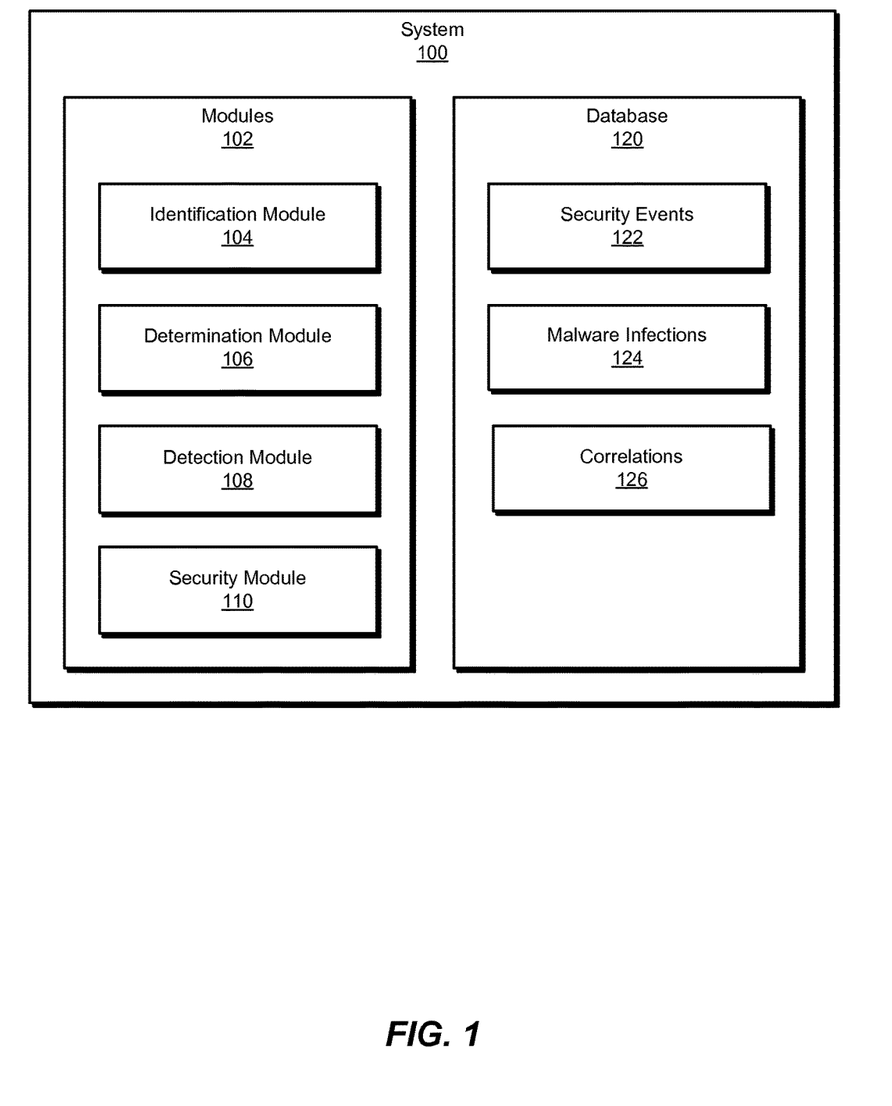
FIG. 1 is a block diagram of an exemplary system for determining types of malware infections on computing devices.
Figure 2:
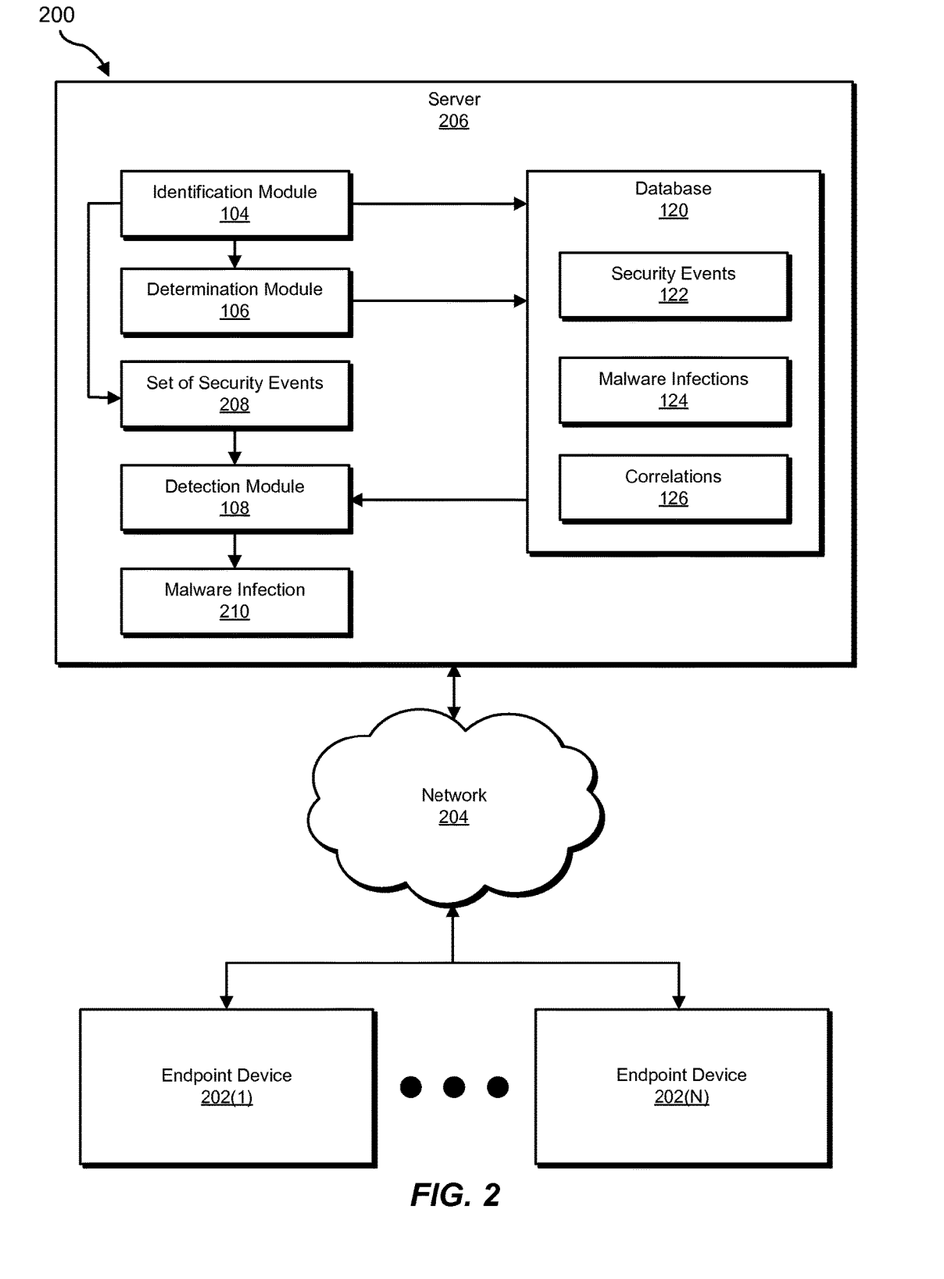
FIG. 2 is a block diagram of an additional exemplary system for determining types of malware infections on computing devices.

The following will provide, with reference to FIGS. 1 and 2, detailed descriptions of exemplary systems for determining types of malware infections on computing devices. Detailed descriptions of corresponding computer-implemented methods will also be provided in connection with FIG. 3. In addition, detailed descriptions of exemplary correlations between types of security events and types of malware infections will be provided in connection with FIG. 4. Finally, detailed descriptions of an exemplary computing system and network architecture capable of implementing one or more of the embodiments described herein will be provided in connection with FIGS. 5 and 6, respectively.

FIG. 1 is a block diagram of an exemplary system 100 for determining types of malware infections on computing devices. As illustrated in this figure, exemplary system 100 may include one or more modules 102 for performing one or more tasks. For example, and as will be explained in greater detail below, exemplary system 100 may include an identification module 104 that (1) identifies multiple types of security events generated by a group of endpoint devices that describe suspicious activities on the endpoint devices, where each of the endpoint devices has one or more types of malware infections and (2) identifies a set of security events generated on a target endpoint device that potentially has a malware infection. Exemplary system 100 may also include a determination module 106 that determines correlations between each type of security event generated by the group of endpoint devices and each type of malware infection within the group of endpoint devices.

In addition, and as will be described in greater detail below, exemplary system 100 may include a detection module 108 that detects, based on both the set of security events generated on the target endpoint device and the correlations between the types of malware infections and the types of security events, at least one type of malware infection likely present on the target endpoint device. Finally, exemplary system 100 may include a security module 110 that performs one or more security measures in response to detecting the type of malware infection that is likely present on the target endpoint device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., endpoint devices 202(1)-(N) and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

In one example, database 120 may be configured to store one or more security events and/or types of security events, such as security events 122. The term "security event," as used herein, generally refers to any type or form of alert, notification, or report that describes one or more suspicious activities identified on a computing device. In some examples, a security program (e.g., an anti-malware program or anti-intrusion program) on a computing device may track the behavior of other programs, files, or users on the computing device to identify any actions that may indicate a potential, impending, or confirmed security breach. The security program may then generate a security event that describes the suspicious behavior in order to notify a user and/or administrator of the computing device.

A security event may contain any information relevant to a detected suspicious behavior, such as specific files or users involved in the event, a time at which the event occurred, a threat level associated with the event, and/or a type of the event. The term "type of a security event," as used herein, generally refers to any categorization or label that broadly classifies a security event. In some examples, an anti-malware program (e.g., implemented across multiple endpoint devices) may be configured to detect a standard set of security event types. Examples of types of security events include, without limitation, attempts to read secure or sensitive files, suspicious queries, execution of suspicious scripts, network traffic re-directs, incorrect formatting, and/or any additional suspicious behavior or activity.

In addition to storing security events 122, database 120 may store malware infections 124, which represents any type of malware infection present on the group of computing devices that generated security events 122. The term "malware infection," as used herein, generally refers to any type or form of virus, adware, spyware, ransomware, rootkit, Trojan horse, worm, and/or other kind of malicious software. In addition, the term "type of a malware infection," as used herein, generally refers to any category or class of malware encompassing various forms of malicious software that exhibit similar properties, behaviors, or characteristics. For example, database 120 may classify both a program that tracks text entered into messaging services and a program that captures screenshots of user interfaces as malware infections of the type "spyware."

Exemplary system 100 in FIG. 1 may be implemented in a variety of ways. For example, all or a portion of exemplary system 100 may represent portions of exemplary system 200 in FIG. 2. As shown in FIG. 2, system 200 may include endpoint devices 202(1)-(N) in communication with a server 206 via a network 204. In the example of FIG. 2, server 206 may be programmed with one or more of modules 102 and/or may store all or a portion of the data in database 120. In this example, server 206 may operate a server-side security program configured to analyze and/or protect endpoint devices 202(1)-(N). For example, endpoint devices 202(1)-(N) may represent a group of related endpoint devices (e.g., computing devices within an organization and/or computing devices that subscribe to a certain anti-malware service). In this example, server 206 may receive and analyze security events generated by endpoint devices 202(1)-(N) to detect likely malware infections on one or more of endpoint devices 202(1)-(N).

In other examples, at least a portion of the security systems described herein may operate client-side on endpoint devices 202(1)-(N). In these examples, endpoint devices 202(1)-(N) may be programmed with one or more of modules 102 and/or may store all or a portion of the data in database 120.

In one embodiment, one or more of modules 102 from FIG. 1 may, when executed by at least one processor of server 206, enable server 206 to determine the types of malware infections on computing devices. For example, and as will be described in greater detail below, identification module 104 may cause server 206 to identify security events 122 generated by one or more of endpoint devices 202(1)-(N), where each of endpoint devices 202(1)-(N) has one or more types of malware infections 124. In addition, determination module 106 may cause server 206 to determine correlations 126 between security events 122 and malware infections 124. Next, identification module 104 may cause server 206 to identify a set of security events 208 generated on a target endpoint device (e.g., one of endpoint devices 202(1)-(N)) that potentially has a malware infection. Finally, detection module 108 may cause server 206 to detect, based on both set of security events 208 and correlations 126, a malware infection 210 likely present on the target endpoint device.

Endpoint devices 202(1)-(N) generally represent any type or form of computing devices capable of reading computer-executable instructions. Examples of endpoint devices 202(1)-(N) include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device that is capable of storing, receiving, and analyzing security events generated by endpoint devices that have or potentially have malware infections. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between endpoint devices 202(1)-(N) and server 206.

Figure 3:
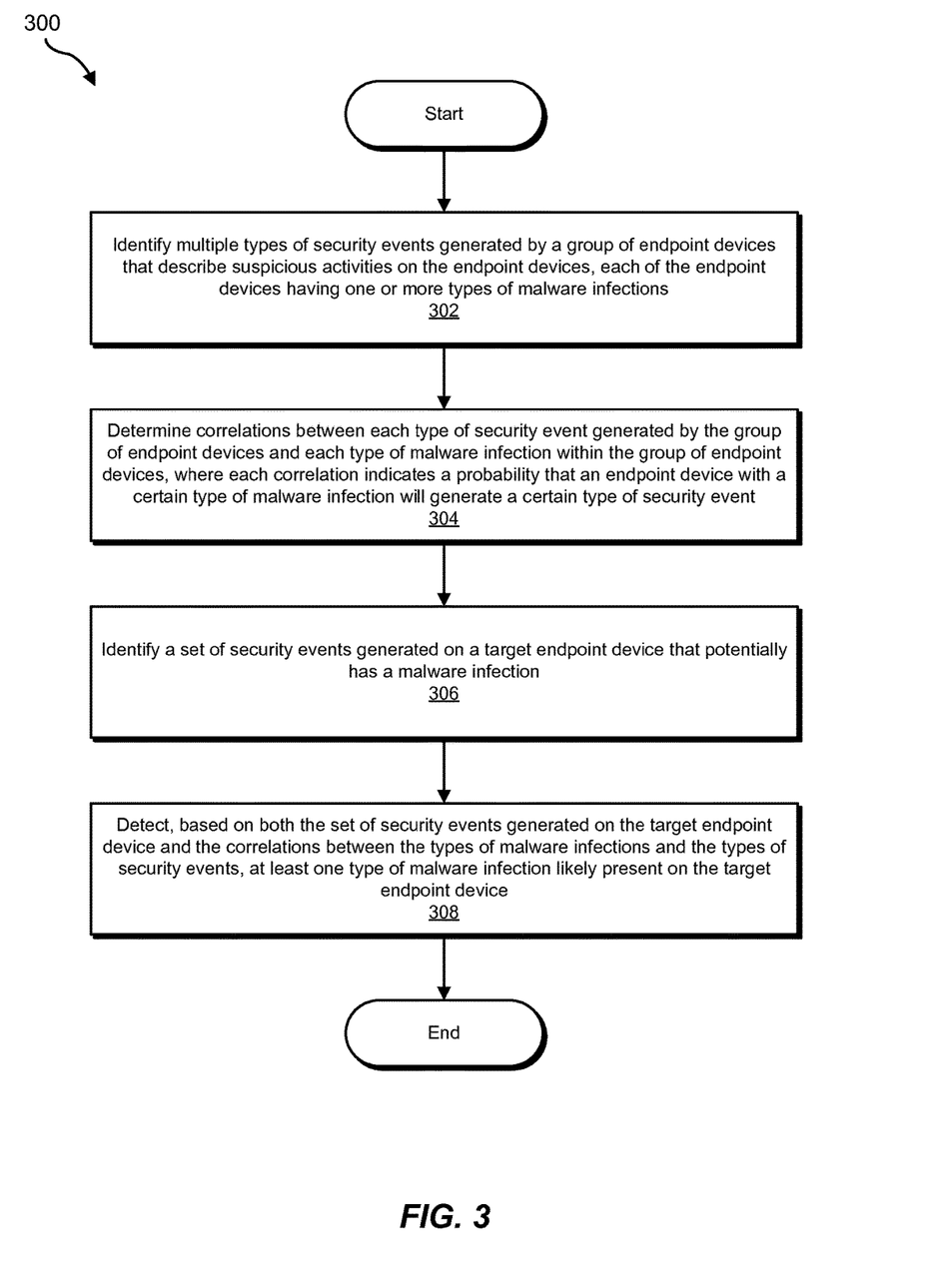
FIG. 3 is a flow diagram of an exemplary method for determining types of malware infections on computing devices.

FIG. 3 is a flow diagram of an exemplary computer-implemented method 300 for determining types of malware infections on computing devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify multiple types of security events generated by a group of endpoint devices that describe suspicious activities on the endpoint devices, where each of the endpoint devices has one or more types of malware infections. For example, identification module 104 may, as part of server 206 in FIG. 2, identify security events 122 generated by one or more of endpoint devices 202(1)-(N), where each endpoint device has one or more of malware infections 124.

The systems described herein may identify types of security events generated by a group of endpoint devices in a variety of ways. In some examples, identification module 104 may receive security events from one or more endpoint devices after the endpoint devices are diagnosed with a malware infection. For example, identification module 104 may prompt a group of endpoint devices to send all the security events generated on the endpoint devices (e.g., in the past day, week, month, etc.) after an anti-malware program on the endpoint devices detects a malware infection on the endpoint devices. The anti-malware program may represent or include any type of form of standard malware scan and/or intrusion detection technology.

In some embodiments, the endpoint devices that generate security events may represent endpoint devices of actual users and the malware infections may represent malware infections inadvertently obtained on the endpoint devices. In other embodiments, identification module 104 may utilize a simulated or test group of endpoint devices to generate security events in response to malware infections. For example, identification module 104 may infect a group of physical or virtual endpoint devices with a variety of types of malware infections and then monitor the security events generated on the infected devices.

Additionally, in some examples, identification module 104 may determine whether a security event is a pre-infection security event or a post-infection security event. The term "pre-infection security event," as used herein, generally refers to any type of security event that is generated before (e.g., immediately before or within a certain period of time before) a malware infection is detected on and/or has been obtained by an endpoint device. As an example, a pre-infection security event may describe an attempt by an external entity to infiltrate an endpoint device (e.g., an unauthorized request to access secure data). In this example, the security event may be generated before any secure data has been illegitimately accessed. On the other hand, the term "post-infection security event," as used herein, generally refers to any type of security event that is generated after (e.g., immediately after or within a certain period of time after) a malware infection is detected on and/or has been obtained by an endpoint device. In some examples, a post-infection security event may describe one or more harmful results of a malware infection, such as secure data being accessed or leaked. In addition, the arrival of a malware infection may generally be characterized by a burst of post-infection security events.

In some embodiments, identification module 104 may store an indication of each type of identified security event (including whether the security event is a pre-infection security event or a post-infection security event). In addition, identification module 104 may record which endpoint device generated the security event and/or the number of that type of security event generated by the endpoint device.

Furthermore, identification module 104 may record any and/or all malware infections present on the endpoint devices that generated the security events. For example, identification module 104 may prompt each endpoint device to send an indication of the types of malware infections detected on the endpoint device along with the types of security events generated on the endpoint device. Identification module 104 may then record this information in a database (e.g., database 120 in FIG. 1) that associates types of security events with types of malware infections. Notably, in some examples, identification module 104 may prompt endpoint devices to indicate whether a malware infection was detected before or after each security event was generated in order to associate pre-infection and post-infection security events with pre-infection and post-infection states of malware infections.

Furthermore, in some examples, identification module 104 may receive and record types of security events generated by endpoint devices that do not have any malware infections. For example, identification module 104 may periodically query one or more healthy endpoint devices for the types of security events generated by the healthy endpoint devices. As will be explained in greater detail below, analyzing security events generated by healthy endpoint devices may enable the systems described herein to determine that additional endpoint devices that generate similar types of security events are likely to also not have any malware infections.

Returning to FIG. 3, at step 304 one or more of the systems described herein may determine correlations between each type of security event generated by the group of endpoint devices and each type of malware infection within the group of endpoint devices, where each correlation indicates a probability that an endpoint device with a certain type of malware infection will generate a certain type of security event. For example, determination module 106 may, as part of server 206 in FIG. 2, determine correlations 126 between each of security events 122 and each of malware infections 124.

Figure 4:
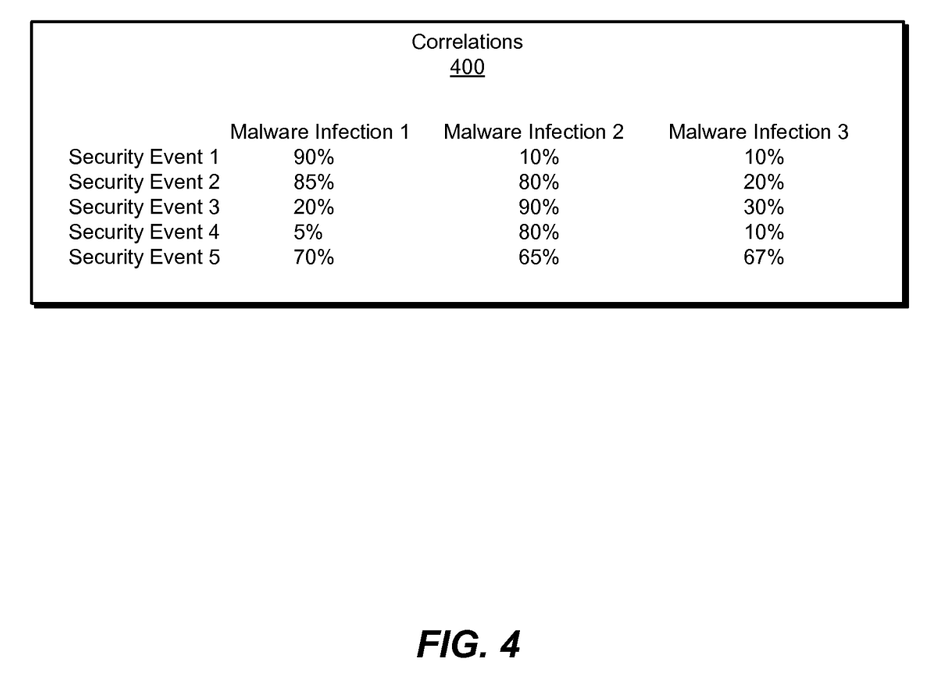
FIG. 4 is an illustration of exemplary correlations between types of security events and types of malware infections.

The systems described herein may determine correlations between types of security events and types of malware infections in a variety of ways. In some examples, determination module 106 may determine a correlation between a type of security event and a type of malware infection by computing a percentage of endpoint devices with the type of malware infection that have generated the type of security event. As an example of such percentages, FIG. 4 illustrates a table containing exemplary correlations 400. In this example, identification module 104 may have identified three types of malware infections (i.e., malware infections 1-3) present on a group of endpoint devices and five types of security events (i.e., security events 1-5) generated by the group of endpoint devices. Furthermore, for each security event identified, identification module 104 may have associated the type of the security event with each type of malware infection present on the endpoint device that generated the security event. Determination module 106 may use these associations to compute the percentages illustrated in FIG. 4. For example, as illustrated in correlations 400, determination module 106 may determine that 90% of endpoint devices that are infected with malware infection 1 have generated security event 1. FIG. 4 illustrates corresponding percentages for the remaining pairs of malware infections and security events.

In some examples, certain types of security events may be more useful and/or effective than other types of security events in distinguishing the presence of various types of malware infections on endpoint devices. For example, as shown in FIG. 4, security event 1 may have a correlation of 90% with malware infection 1 and a correlation of 10% with both malware infection 2 and malware infection 3. As such, the presence of security event 1 on an endpoint device (e.g., combined with an analysis of additional security events) may indicate a high likelihood that the endpoint device has malware infection 1, while the lack of security event 1 on an endpoint device may indicate a high likelihood that the endpoint device does not have malware infection 1. On the other hand, FIG. 4 shows that security event 5 may have a correlation of 70% with malware infection 1, a correlation of 65% with malware infection 2, and a correlation of 67% with malware infection 3. Because each correlation associated with security event 5 is within a close range, the presence of (or lack of) security event 5 on an endpoint device may not be as useful in determining a type of malware infection likely present on the endpoint device. As such, determination module 106 may exclude security event 5 (and any other security event whose associated correlations all fall within a predetermined threshold of closeness) from analyses used to determine types of malware infections on target endpoint devices.

Determination module 106 may utilize any additional or alternative calculation or metric to determine correlations that indicate and/or quantify relationships between types of security events and types of malware infections. For example, determination module 106 may determine the number of endpoint devices that generated certain combinations of security events and/or determine the percentage of endpoint devices that generated a certain type of security event that have a certain type of malware infection. Furthermore, in some examples, determination module 106 may compute correlations between one or more types of security events and healthy endpoint devices.

Returning to FIG. 3, at step 306 one or more of the systems described herein may identify a set of security events generated on a target endpoint device that potentially has a malware infection. For example, identification module 104 may, as part of server 206 in FIG. 2, identify set of security events 208 that were generated on one of endpoint devices 202(1)-(N).

The term "target endpoint device," as used herein, generally refers to any type or form of endpoint device that is being analyzed for malware infections and/or is under suspicion of having one or more malware infections. In some examples, identification module 104 may receive a set of security events from a target endpoint device in response to a user of the target endpoint device requesting the systems described herein to determine a likelihood that the target endpoint device has one or more types of malware infections. Additionally or alternatively, identification module 104 may periodically identify and analyze the security events generated on a target endpoint device as part of a security protocol implemented on the target endpoint device.

Returning to FIG. 3, at step 308 one or more of the systems described herein may detect, based on both the set of security events generated on the target endpoint device and the correlations between the types of malware infections and the types of security events, at least one type of malware infection likely present on the target endpoint device. For example, detection module 108 may detect, based on set of security events 208 and correlations 126, malware infection 210 likely present on the target endpoint device.

The systems described herein may detect a type of malware infection likely present on a target endpoint device in a variety of ways. In some examples, detection module 108 may determine that one or more malware infections are likely present on a target endpoint device based on an analysis of and/or comparison between the security events generated on the target endpoint device and previously-identified correlations between types of security events and types of malware infections. Detection module 108 may apply any type or form of statistical analysis to the security events generated on a target endpoint device in order to predict the likelihood that the target endpoint device has certain types of malware infections.

In an exemplary embodiment, detection module 108 may implement one or more probabilistic classifiers to determine whether a target endpoint device likely has any malware infections. The term "probabilistic classifier," as used herein, generally refers to any type or form of statistical model, algorithm, or procedure that is used to predict the probabilities of multiple outcomes given a certain input or set of inputs. As applied to determining types of malware infections on endpoint devices, the systems described herein may use a probabilistic classifier to determine probabilities that an endpoint device has each of a variety of types of malware infections based on multiple types of security events generated by the endpoint device.

In particular, detection module 108 may apply a naïve Bayes classification to a set of security events generated by a target endpoint device. The term "naïve Bayes classification," as used herein, generally refers to any type or form of probabilistic classifier based on Bayes' theorem. The probability that a target endpoint device is infected with a certain type of malware infection, as determined by the naïve Bayes probability model, may be given by the following formula:

$$P_{Infection\ Y} = \text{Prevalence of Infection } Y * \prod_{X=1}^{n} \frac{\text{Prevalence of Event } X \text{ for Infection } Y}{\text{Prevalence of Event } X},$$

where the Prevalence of Infection Y is the percentage of endpoint devices within a group of endpoint devices that have Infection Y, Event X is one type of security event generated by the target endpoint device, Prevalence of Event X for Infection Y is the correlation between Event X and Infection Y within the group of endpoint devices (e.g., the correlation as described in connection with FIG. 4), and Prevalence of Event X is the percentage of endpoint devices within the group of endpoint devices that have generated Event X.

As illustrated by the above formula, the naïve Bayes probability model may take into account each type of security event generated by a target endpoint device when determining the likelihood that the target endpoint device has a certain type of malware infection. As such, the systems described herein may use a naïve Bayes classification (or any similar classification) to perform a robust, comprehensive analysis of the security events generated by a target endpoint device, rather than attempting to detect malware infections by simply identifying individual security events (as done by many traditional anti-malware systems).

In some embodiments, detection module 108 may use the above-described formula to determine a probability that an endpoint device has each of a variety of types of malware infections (e.g., each type of malware infection within malware infections 124). Detection module 108 may then identify one or more types of malware infections likely to be present on the target endpoint device based on the results of the classification. For example, detection module 108 may identify the type of malware infection that has the greatest probability of being present on the target endpoint device (e.g., detection module 108 may apply the decision rule of selecting the highest calculated probability). Additionally or alternatively, detection module 108 may identify each type of malware infection that has a computed probability over a certain threshold (e.g., 0.5 or 0.75).

As previously mentioned, the systems described herein may divide security events into pre-infection and post-infection security events, as well as differentiate one or more types of malware infections into pre-infection and post-infection categories. Accordingly, detection module 108 may complete a naïve Bayes classification that treats a pre-infection state of a type of malware infection as one malware infection type and a post-infection state of the type of malware infection as another malware infection type. In this way, detection module 108 may determine whether a target endpoint device is at an elevated risk of being infected with a type of malware infection (but is not yet infected), or if the target endpoint device has likely already been infected with the malware infection.

After identifying one or more types of malware infections likely present on a target endpoint device, the systems described herein may take any appropriate action to prevent and/or eliminate harmful effects of the malware infections. For example, in the event that detection module 108 determines that a target endpoint device is likely to be infected with a certain type of malware infection, security module 110 may warn a user and/or administrator of the target endpoint device about the impending threat. Additionally or alternatively, security module 110 may increase security measures on the target endpoint device to reduce the risk of the target endpoint device being infected with the identified type of malware infection. For example, security module 110 may add one or more security protocols on the target endpoint device that are tailored specifically to detecting and/or preventing the identified type of malware infection.

In the event that detection module 108 determines that a target endpoint device likely already has a malware infection, security module 110 may run a malware scan on the target endpoint device to confirm the presence of the malware infection. Additionally or alternatively, security module 110 may attempt to remove the malware infection from the target endpoint device.

Furthermore, as previously mentioned, the systems and methods described herein may record security events generated by endpoint devices that do not have any malware infections in order to determine that a target endpoint device is also likely to not have any malware infections. For example, detection module 108 may determine, based on a probabilistic classification of the types of security events generated by a target endpoint device, that the most likely state of the target endpoint device is free from any malware infections.

As explained above in connection with FIG. 3, a backend security server may receive and analyze security events generated by a group of endpoint devices that each have one or more malware infections. Based on the analysis, the security server may determine correlations between types of security events and types of malware infections. After receiving security events generated by a target endpoint device that potentially has a malware infection, the security server may determine whether one or more types of malware infections are likely present on the target endpoint device based on the previously-determined correlations. In particular, the security server may determine whether the target endpoint device is likely to be infected with a certain type of malware infection or is likely already infected. The security server may then direct the target endpoint device to take appropriate measures to prevent and/or remove the malware infection.

Figure 5:
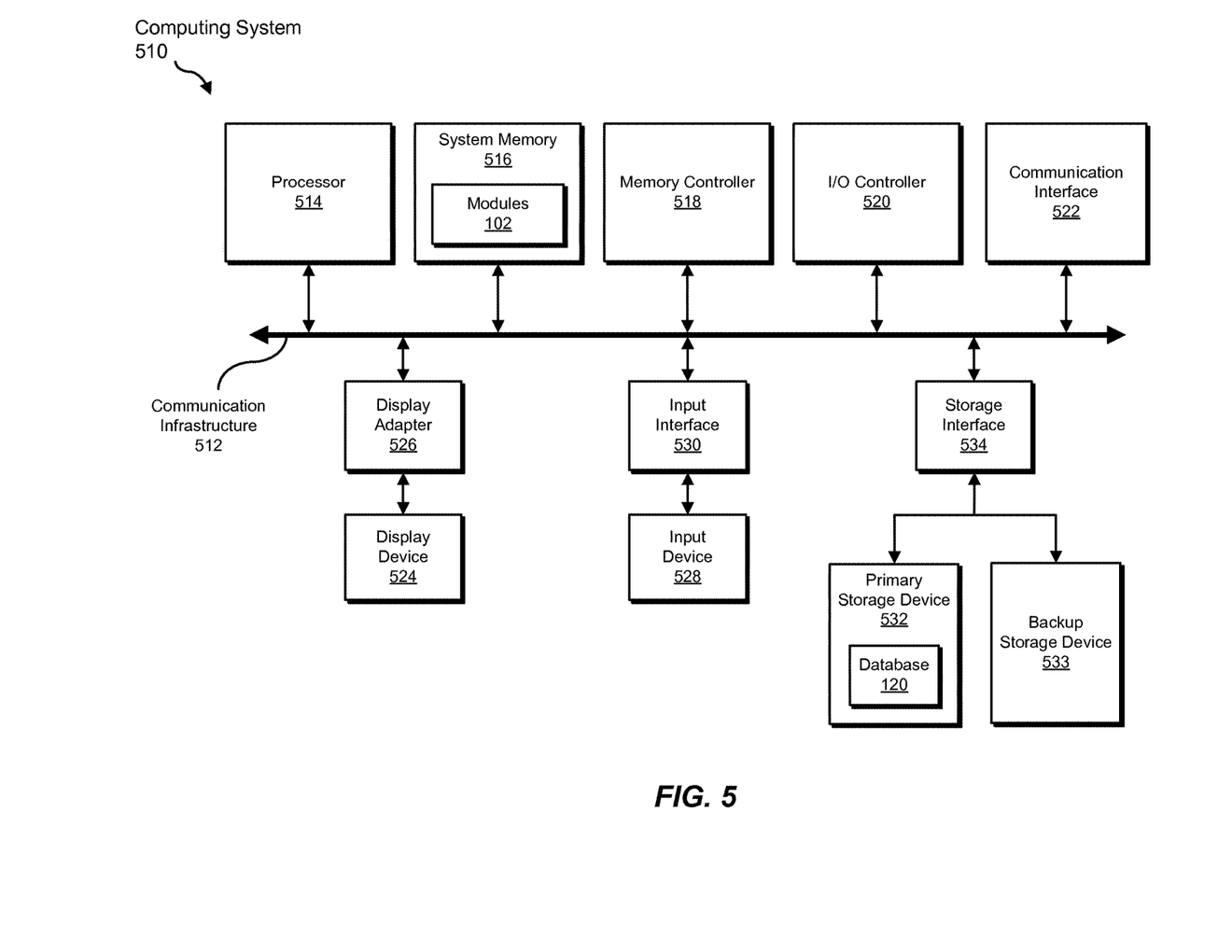
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
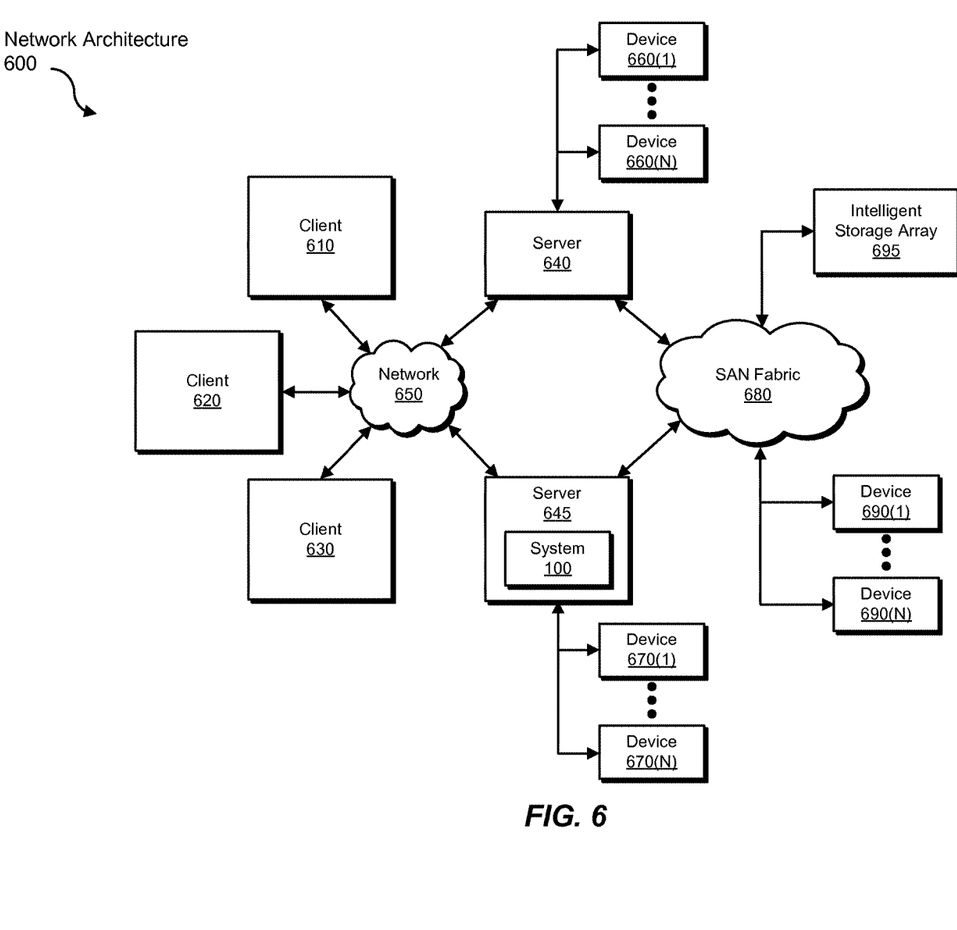
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for determining types of malware infections on computing devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants).

One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive security events from endpoint devices infected with various types of malware infections, transform the security events into correlations between types of security events and types of malware infections, use the result of the transformation to determine types of malware infections likely present on target endpoint devices, store the result of the transformation in a server or database, and output a result of the transformation to a user of the target endpoint device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for determining types of malware infections on computing devices, at least a portion of the method being performed by one or more computer devices each comprising at least one processor, the method comprising:
   identifying, by the one or more computer devices, a plurality of types of security events generated by a group of endpoint computer devices that describe suspicious activities on the endpoint computer devices, each of the endpoint computer devices having one or more types of malware infections;
   determining, by the one or more computer devices, correlations between each type of security event generated by the group of endpoint computer devices and each type of malware infection within the group of endpoint computer devices, wherein each correlation indicates a probability that an endpoint computer device with a certain type of malware infection will generate a certain type of security event;
   identifying, by the one or more computer devices, a set of security events generated on a target endpoint computer device that potentially has a malware infection;
   detecting, by the one or more computer devices, based on both the set of security events generated on the target endpoint computer device and the correlations between the types of malware infections and the types of security events, at least one type of malware infection that is more likely to be present on the target endpoint computer device than at least one additional type of malware infection; and
   performing, by the one or more computer devices, based on the type of malware infection that is more likely to be present on the target endpoint computer device than the additional type of malware infection, a security action designed to prevent the type of malware infection from harming the target endpoint computer device, the security action comprising at least one of:
   running a malware scan on the target endpoint computer device to confirm the presence of the malware infection on the target endpoint computer device; and
   attempting to remove the malware infection from the target endpoint computer device.

2. The method of claim 1, wherein determining the correlation between the certain type of security event and the certain type of malware infection comprises determining a percentage of endpoint computer devices with the certain type of malware infection that have generated the certain type of security event.

3. The method of claim 1, wherein detecting the type of malware infection that is more likely to be present on the target endpoint computer device than the additional type of malware infection comprises:
   for each type of malware infection, determining a probability that the target endpoint computer device has the type of malware infection; and
   identifying the type of malware infection most likely to be present on the target endpoint computer device based on the determined probabilities.

4. The method of claim 1, wherein detecting the type of malware infection that is more likely to be present on the target endpoint computer device than the additional type of malware infection comprises performing a naïve Bayes classification.

5. The method of claim 1, further comprising, for at least one type of malware infection, identifying:
   pre-infection security events that are likely to be generated by an endpoint computer device before the endpoint computer device is infected with the type of malware infection; and
   post-infection security events that are likely to be generated by the endpoint computer device after the endpoint computer device is infected with the type of malware infection.

6. The method of claim 5, wherein detecting the type of malware infection that is more likely to be present on the target endpoint computer device than the additional type of malware infection comprises determining, based on the pre-infection security events, that the target endpoint computer device is at an elevated risk of being infected with the type of malware infection but is not yet infected.

7. The method of claim 6, wherein performing the security action designed to prevent the type of malware infection from harming the target endpoint computer device further comprises increasing security measures on the target endpoint computer device to reduce the risk of the target endpoint computer device being infected with the type of malware infection.

8. The method of claim 5, wherein detecting the type of malware infection that is more likely to be present on the target endpoint computer device than the additional type of malware infection comprises determining, based on the post-infection security events, that the target endpoint computer device has likely already been infected with the type of malware infection.

9. The method of claim 1, further comprising:
   identifying at least one type of security event generated by an endpoint computer device that does not have any malware infections; and
   determining, based on the security event generated by the endpoint computer device that does not have any malware infections and a set of security events generated by an additional target endpoint computer device, that the additional target endpoint computer device is likely to not have any malware infections.

10. A system for determining types of malware infections on computing devices, the system comprising:
    an identification module, stored in memory, that identifies a plurality of types of security events generated by a group of endpoint computer devices that describe suspicious activities on the endpoint computer devices, each of the endpoint computer devices having one or more types of malware infections;
    a determination module, stored in memory, that determines correlations between each type of security event generated by the group of endpoint computer devices and each type of malware infection within the group of endpoint computer devices, wherein:
    each correlation indicates a probability that an endpoint computer device with a certain type of malware infection will generate a certain type of security event; and the identification module further identifies a set of security events generated on a target endpoint computer device that potentially has a malware infection;

a detection module, stored in memory, that detects, based on both the set of security events generated on the target endpoint computer device and the correlations between the types of malware infections and the types of security events, at least one type of malware infection that is more likely to be present on the target endpoint computer device than at least one additional type of malware infection;

a security module, stored in memory, that performs, based on the type of malware infection that is more likely to be present on the target endpoint computer device than the additional type of malware infection, a security action designed to prevent the type of malware infection from harming the target endpoint computer device, the security action comprising at least one of:

running a malware scan on the target endpoint computer device to confirm the presence of the malware infection on the target endpoint computer device; and attempting to remove the malware infection from the target endpoint computer device; and one or more computer devices each comprising at least one hardware processor that is configured to execute the identification module, the determination module, the detection module, and the security module.

11. The system of claim 10, wherein the determination module determines the correlation between the certain type of security event and the certain type of malware infection by determining a percentage of endpoint computer devices with the certain type of malware infection that have generated the certain type of security event.

12. The system of claim 10, wherein the detection module detects the type of malware infection that is more likely to be present on the target endpoint computer device than the additional type of malware infection by:

for each type of malware infection, determining a probability that the target endpoint computer device has the type of malware infection; and identifying the type of malware infection most likely to be present on the target endpoint computer device based on the determined probabilities.

13. The system of claim 10, wherein the detection module detects the type of malware infection that is more likely to be present on the target endpoint computer device than the additional type of malware infection by performing a naïve Bayes classification.

14. The system of claim 10, wherein the determination module further identifies, for at least one type of malware infection:

pre-infection security events that are likely to be generated by an endpoint computer device before the endpoint computer device is infected with the type of malware infection; and post-infection security events that are likely to be generated by the endpoint computer device after the endpoint computer device is infected with the type of malware infection.

15. The system of claim 14, wherein the detection module detects the type of malware infection that is more likely to be present on the target endpoint computer device than the additional type of malware infection by determining, based on the pre-infection security events, that the target endpoint computer device is at an elevated risk of being infected with the type of malware infection but is not yet infected.

16. The system of claim 15, wherein the security module further performs the security action designed to prevent the type of malware infection from harming the target endpoint computer device by increasing security measures on the target endpoint computer device to reduce the risk of the target endpoint computer device being infected with the type of malware infection.

17. The system of claim 14, wherein the detection module detects the type of malware infection that is more likely to be present on the target endpoint computer device than the additional type of malware infection by determining, based on the post-infection security events, that the target endpoint computer device has likely already been infected with the type of malware infection.

18. A non-transitory computer-readable medium comprising one or more computer-readable instructions that, when executed by at least one processor of one or more computer devices, cause the one or more computer devices to:

identify a plurality of types of security events generated by a group of endpoint computer devices that describe suspicious activities on the endpoint computer devices, each of the endpoint computer devices having one or more types of malware infections;

determine correlations between each type of security event generated by the group of endpoint computer devices and each type of malware infection within the group of endpoint computer devices, wherein each correlation indicates a probability that an endpoint computer device with a certain type of malware infection will generate a certain type of security event;

identify a set of security events generated on a target endpoint computer device that potentially has a malware infection;

detect, based on both the set of security events generated on the target endpoint computer device and the correlations between the types of malware infections and the types of security events, at least one type of malware infection that is more likely to be present on the target endpoint computer device than at least one additional type of malware infection; and perform, based on the type of malware infection that is more likely to be present on the target endpoint computer device than the additional type of malware infection, a security action designed to prevent the type of malware infection from harming the target endpoint computer device, the security action comprising at least one of:

running a malware scan on the target endpoint computer device to confirm the presence of the malware infection on the target endpoint computer device; and attempting to remove the malware infection from the target endpoint computer device.

* * * * *